United States Patent [19]
Kyburz et al.

[11] 3,898,239
[45] Aug. 5, 1975

[54] TRICYCLIC COMPOUNDS

[75] Inventors: Emilio Kyburz, Reinach; Hans Spiegelberg, Basel, both of Switzerland

[73] Assignee: Hoffmann-La Roche Inc., Nutley, N.J.

[22] Filed: Oct. 3, 1973

[21] Appl. No.: 403,143

Related U.S. Application Data

[60] Division of Ser. No. 169,561, Aug. 4, 1971, Pat. No. 3,786,095, which is a continuation of Ser. No. 744,674, July 15, 1968, abandoned.

[52] U.S. Cl. 260/293.62; 260/240 TC; 260/247.2 A; 260/247.2 B; 260/247.5 R; 260/268 TR; 260/326.33; 260/326.81; 260/465 E; 260/471 C; 260/562 P; 260/570.8 TC
[51] Int. Cl.² ................................ C07D 295/12
[58] Field of Search 260/240 TC, 247.2 A, 247.2 B, 260/247.5 R, 268 TR, 293.62, 326.33, 326.81, 465 E, 471 C, 562 P, 570.8 TC

[56] References Cited
UNITED STATES PATENTS
3,457,264 7/1969 Viterbo et al. ................... 260/268
3,716,541 2/1973 Dobson et al. ................... 260/286 R
3,780,106 12/1973 Taub et al. ................... 260/570.8 TC

OTHER PUBLICATIONS

Theobald et al., Chem. Abstracts, 67:115430r, (1967).

*Primary Examiner*—G. Thomas Todd
*Attorney, Agent, or Firm*—Samuel L. Welt; Bernard S. Leon; William G. Isgro

[57] ABSTRACT

5-[3-(Substituted amino)-alkylidene]-5,11-dihydro-10H-dibenzo [a,d]cyclohepten-10-ones, 5-[3-(substituted amino)-alkyl]-5,11-dihydro-10H-dibenzo[a,d]cyclohepten-10-ones and analogs thereof are prepared, inter alia, from the correspondingly substituted 3-[10-X-5H-dibenzo[a,d]cyclohepten-5-ylidene]-N-substituted alkyl amines and 3-[10-X-5H-dibenzo[a,d]cyclohepten-5-yl]-N-substituted alkyl amines, wherein X is halogen, alkoxy, aralkoxy, amino or substituted amino. The products are useful as antidepressants.

8 Claims, No Drawings

TRICYCLIC COMPOUNDS

CROSS-REFERENCE TO RELATED APPLICATIONS

This application is a division of U.S. pat. application Ser. No. 169,561, filed Aug. 4, 1971, now U.S. Pat. No. 3,786,095, which in turn is a continuation application of Ser. No. 744,674, filed July 15, 1968 now abandoned.

SUMMARY OF THE INVENTION

The invention relates to compounds of the formulas

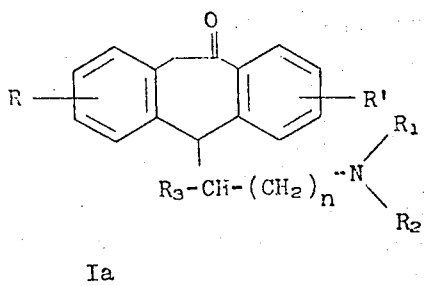

Ia and

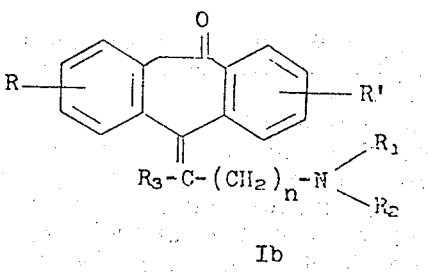

Ib

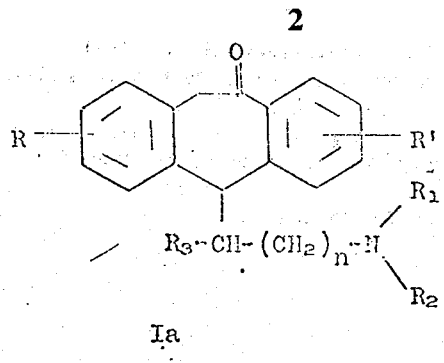

Ia and

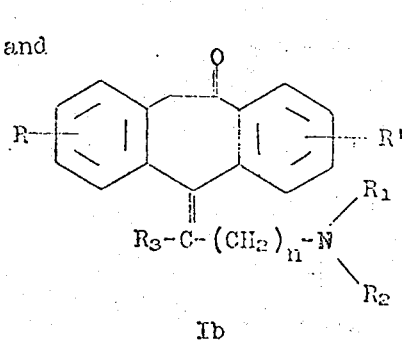

Ib wherein $n$ is a whole number from 0 to 3; R and R' are hydrogen, halogen, lower alkyl, lower alkoxy or lower alkanoyl; $R_1$ is hydrogen or lower alkyl; $R_2$ is lower alkyl; $R_3$ is hydrogen; $R_1$ and $R_2$, taken together with the nitrogen atom form a 5- or 6-membered saturated heterocyclic residue containing at most one additional hetero atom selected from the group consisting of nitrogen and oxygen; and $R_2$ and $R_3$, taken together, are lower alkylene,
and their pharmaceutically acceptable acid addition salts.

In another aspect, the invention relates to intermediates utilized in the preparation of the compounds of Formula Ia or Ib.

DETAILED DESCRIPTION OF THE INVENTION

The invention relates to compounds of the formulas wherein $n$ is an integer from 0 to 3; R and R' are hydrogen, halogen, lower alkyl, lower alkoxy or lower alkanoyl; $R_1$ is hydrogen or lower alkyl; $R_2$ is lower alkyl; $R_3$ is hydrogen; $R_1$ and $R_2$, taken together with the nitrogen atom, form a 5- or 6-membered saturated heterocyclic residue which can contain nitrogen or oxygen as an additional hetero atom; and $R_2$ and $R_3$ taken together are lower alkylene,
and their pharmaceutically acceptable acid addition salts.

As used herein, the term "lower alkyl" is to be understood preferably to mean a straight or branched chain alkyl group of 1 to 6 carbon atoms, such as methyl, ethyl, isopropyl, butyl, pentyl, hexyl, and the like. The term "lower alkylene" is to be understood preferably to mean alkylene of 1 to 4 carbon atoms, such as methylene, ethylene, propylene, butylene and the like. The term lower alkenyl is understood to mean an alkenyl of 2 to 6 carbon atoms, such as vinyl, allyl and the like. The term lower alkoxy is to be understood preferably to mean a lower alkyl ether group in which the lower alkyl moiety is as described above, for example, methoxy, ethoxy and the like. The term "halogen" is to be understood to mean all of the halogens preferably, fluorine, chlorine and bromine. The term "aralkyl" is understood to mean a straight or branched chain lower alkyl group in which one or more of the hydrogen atoms have been replaced by an aryl group. The term "aryl" is understood to mean phenyl or phenyl having one or more substituents selected from the group consisting of halogen, trifluoromethyl, lower alkyl, lower alkoxy, nitro, amino, lower alkylamino and di-lower alkylamino. The term "lower alkanoyl" is to be understood preferably to mean residues derived from lower alkano carboxylic acids of 1 to 6 carbon atoms, such as formyl, acetyl and the like. As used herein, the term "5- or 6-membered saturated heterocyclic residue" is to be understood to mean piperidino, lower alkyl-substituted piperidino, such as methylpiperidino, piperazino, lower alkyl-substituted piperazino, pyrrolidino, lower alkyl-substituted pyrrolidino, morpholine and lower alkyl-substituted morpholino. When $R_2$ and $R_3$ are taken together they form, for example, piperidyl.

Exemplary of the compounds of the invention are:
α- and β-isomers of 5-[3-(dimethylamino)-propylidene]-5,11-dihydro-10H-dibenzo[a,d]cyclohepten-10-one; α- and β-isomers of 5,11-dihydro-5-(3-piperidino-propylidene)-10H-dibenzo[a,d]cyclohepten-10-one; 5-[3-(dimethylamino)-propyl]-5,11-dihydro-10H-dibenzo[a,d]cyclohepten-10-one;

5,11-dihydro-5-(1-methyl-4-piperidylene)-10H-dibenzo[a,d]cyclohepten-10-one, which do not exist in isomeric forms, and the like.

The dibenzocycloheptenes of the invention can be prepared by one of several alternate procedures, for example:

1. A compound of the formula

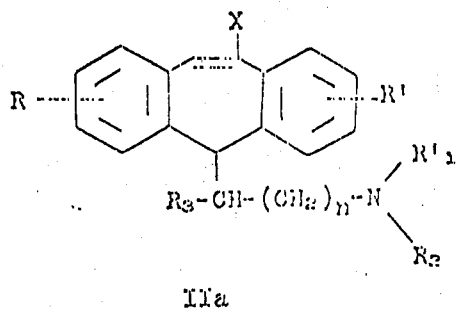

IIa or

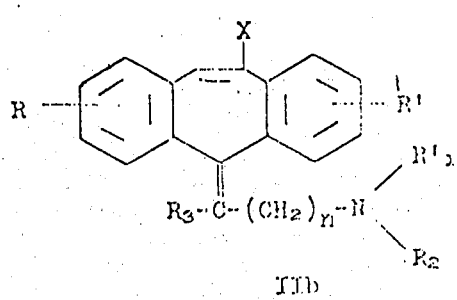

IIb wherein R, R', R₂, R₃ and n are as previously described; R'₂ is hydrogen, lower alkyl, lower alkoxycarbonyl, lower alkanoyl or cyano and X is halogen, lower alkoxy, aralhoxy, amino of the formula

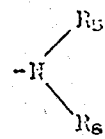

wherein R₅ and R₆ are lower alkyl, lower alkenyl or aralkyl, or R₅ and R₆ together with the nitrogen atom form a 5- or 6-membered saturated heterocyclic residue which can be substituted by lower alkyl and which can contain nitrogen or oxygen as an additional hetero atom; and R'₁ and R₂ together with the nitrogen atom form a 5- or 6-membered saturated heterocyclic residue which can contain nitrogen or oxygen as an additional hetero atom,
is hydrolyzed;

2. A compound of the formula

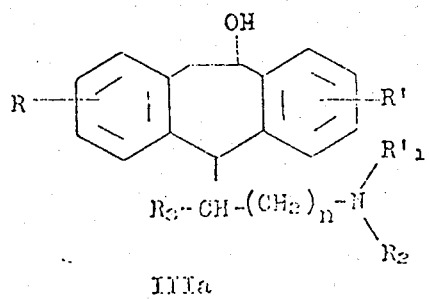

IIIa or

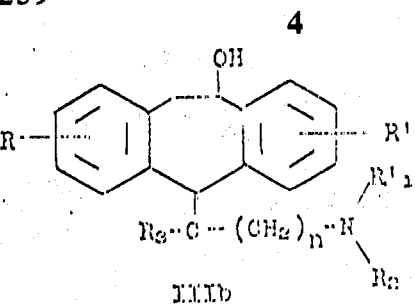

IIIb wherein R, R', R'₂, R₂, R₃ and n are as previously described,
is oxidized; or 3. A compound of the formula

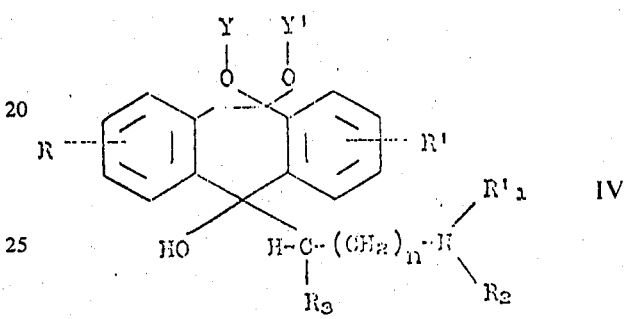

IV wherein R, R', R'₁, R₂, R₃ and n are as previously described and Y and Y' are lower alkyl and taken together are lower alkylene,
is dehydrated and deketalized.

Thereafter, the alkoxy carbonyl, alkanoyl or cyano group of R'₁ can be cleaved. The dialkylamino group can be optionally dealkylated to a monoalkylamino group. The semicyclic double bond which is present can be hydrogenated, if desired, optionally after masking of the keto group. A masked keto group can be again converted to the free keto group. An isomeric mixture which is obtained can optionally be separated, and the reaction mixture which is obtained optionally coverted into an acid addition salt.

Compounds of formulas IIa and IIb, wherein X is a halogen atom, that is, compounds of the formulas

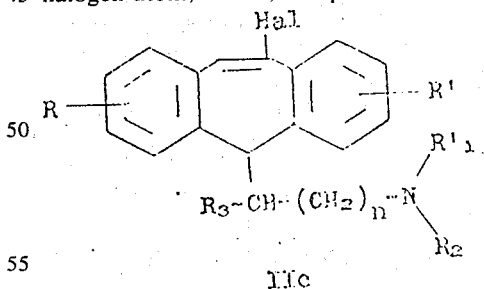

IIc and

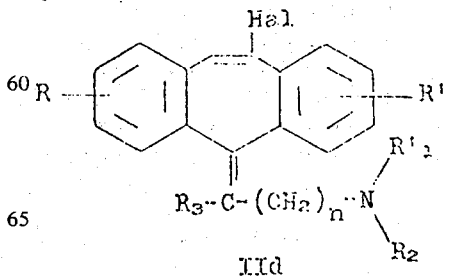

IId wherein R, R', R'₂, R₂, R₃ and $n$ are as previously described; Hal is a halogen atom;

can, for example, be prepared starting with the corresponding 10-halo-dibenzo[a,d]cyclohepten-5-one. More particularly, 10-bromo-dibenzo[a,d]cyclohepten-5-one is, for example, linked with an N-mono- or N-disubstituted aminoalkyl halide utilizing a metal-organic reaction, converted by hydrolysis to the desired 5-hydroxy-5-(N-mono- or N-disubstituted aminoalkyl) derivative, and dehydrated in a known manner.

Alternatively, the aforesaid 10-bromo-dibenzo[a,d]cyclohepten-5-one is reacted with an N-mono- or N-disubstituted aminoalkyl halide in a known manner, in the presence of 2 gram atoms of sodium per 1 mol. of ketone, hydrolyzed, and dehydrated in a known manner.

A further alternate procedure for the preparation of the starting compounds of formulas IIc and IId comprises hydrogenating a 10-halo-dibenzo[a,d]cyclohepten-5-one utilizing a mixed metal hydride, such as, sodium berehydride, to the corresponding carbinol, converting the resulting product into the halide, for example, by treatment with a thionyl halide, and, thereafter, reacting the halide with the desired side-chain component, for example, with a dimethylaminopropyl magnesium halide, according to the Wurtz procedure.

Starting compounds of formulas IIa and IIb wherein X denotes an alkoxy or aralkoxy group, that is, compounds of the formulas

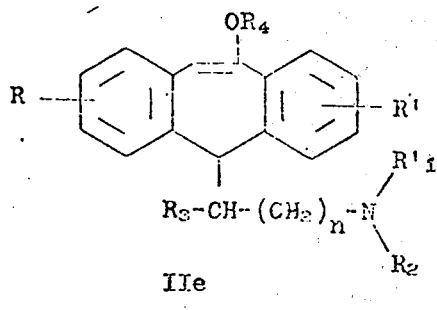

IIe and

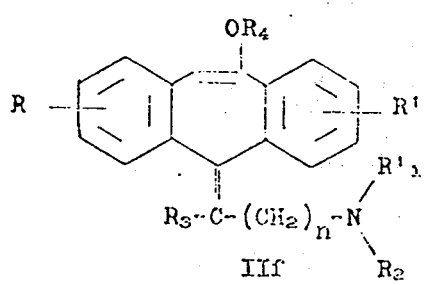

IIf wherein R, R', R'₁, R₂, R₃ and $n$ are as previously described and R₄ is lower alkyl or lower aralkyl, can, for example, be prepared from the corresponding compound of formula IIc or IId by heating said compound with an excess of an alkali-metal compound of an alkanol, such as, posassium n-butylate or potassium tert.-butylate, or also with an excess of alkali metal hydroxide, such as, sodium hydroxide, in a higher alkanol at a temperature in the range of about room temperature and the boiling point of the reaction mixture.

Starting compounds of formulas IIa and IIb wherein X is an amino group, that is, compounds of the formulas

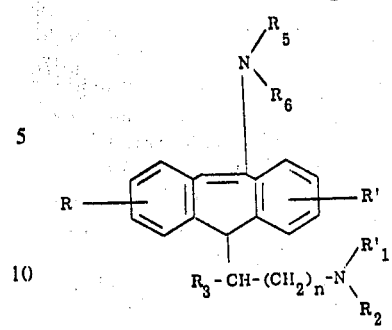

IIg and

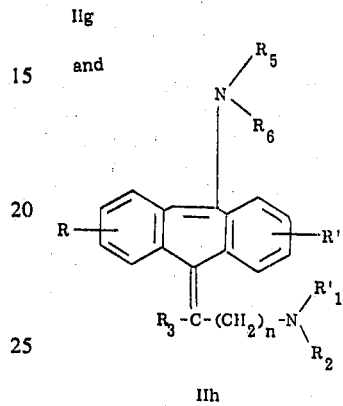

IIh wherein R, R', R'₂, R₂, R₃ and $n$ are as previously described; R₅ and R₆ are lower alkyl, lower alkenyl or lower aralkyl; and R₅ and R₈ taken together with the nitrogen atom form a 5- or 6-membered saturated unsubstituted or substituted by lower alkyl heterocyclic residue containing at most one additional hetero atom selected from the group consisting of nitrogen and oxygen, can, for example, be prepared from the corresponding compound of formula IIc or IId by reacting said compound with a disubstituted or cyclic amine, for example, dimethylamine, piperidine, N-methylpiperazine or N-methylbenzylamine, in the presence of a strong base, for example, potassium tert.-butylete in an inert solvent, such as an ether, for example, ethyl ether, dioxane and the like, at a temperature in the range of about room temperature and the boiling temperature of the reaction mixture.

Starting compounds of the formulas

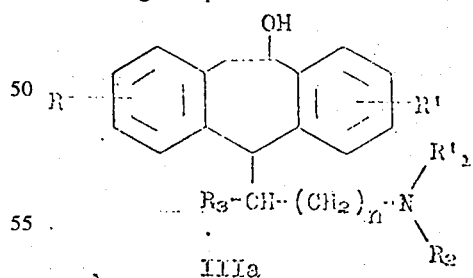

IIIa and

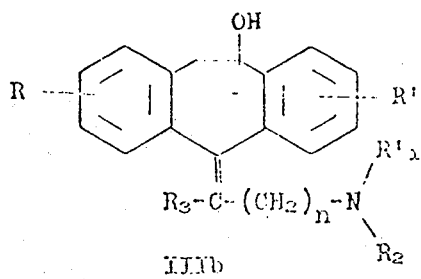

IIIb wherein R, R', R'$_1$, R$_2$, R$_3$ and $n$ are as previously described;
can, for example, be prepared by converting the corresponding 5H-dibenzo[a,d]cycloheptene derivative having the desired side-chain and ring-substitution by treatment with diborane in an inert solvent, for example, ethyl ether, tetrahydrofuran, and the like, at a temperature in the range of about 0° and room temperature to the N-borane salt substituted in the 10- or 11-position by the —NH$_2$ residue; transforming this product by an oxidative hydrolysis, preferably by the action of alcoholic hydrogen peroxide at a temperature in the range of between about room temperature and the boiling point of the reaction mixture, to the 10- or 11-hydroxy-N-borane salt; and thereafter releasing the base therefrom by treatment with potassium iodate in an alkanol, such as, methanol, in the presence of an acidic agent, such as hydrochloric acid, at a temperature in the range of about 0° and room temperature.

Starting compounds of the formula

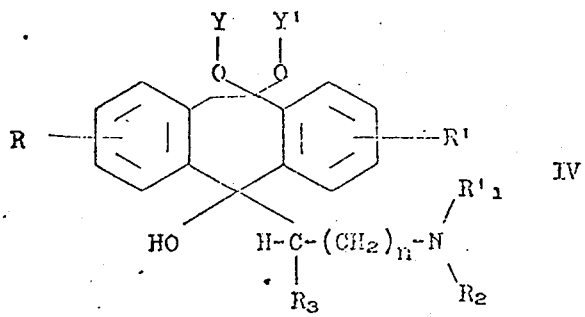

IV wherein R, R', R'$_1$, R$_2$, R$_3$ and $n$ are as previously described; Y and Y' are lower alkyl and taken together are lower alkylene; can, for example, be prepared by reacting the corresponding 10,11-dihydro-5H-dibenzo[a,d]cycloheptene-5,10-dione in a known manner with a ketalizing agent, for example, with an alkanol, such as, ethanol, or with a glycol, such as, ethyleneglycol in an inert solvent, for example, benzene or toluene, in the presence of an acidic catalyst, preferably in the presence of toluenesulfonic acid or in the presence of gaseous hydrochloric acid, at an elevated temperature, preferably at the boiling point of the reaction mixture. The ketal thus obtained is subsequently linked with the desired side chain and dehydrated as previously described for the preparation of the starting compounds of formulas IIc and IId, for example, by a metal-organic reaction.

The semicyclic double bond of the starting compounds of formula IIIb insofar as the compounds contain no reducible groups, particularly, no halogen atoms, can be hydrogenated to the single bond in the same manner as described hereinafter for the reduction of the process products of formula Ib.

The compounds of formulas IIc, IId, IIe, IIf, IIg and IIh are converted into the respective compounds of formula Ia or Ib by hydrolysis. For the hydrolysis of compounds of formulas IIe, IIf, IIg and IIh, preferably aqueous mineral acids, such as, hydrochloric acid, sulfuric acid or phosphoric acid, is utilized. If desired, strong organic acids, such as formic acid, acetic acid or oxalic acid can be utilized. The reaction temperature is not critical. Thus, the hydrolysis can be carried out at a temperature in the range of about room temperature and the boiling temperature of the reaction mixture, preferably between about 80° and 120°C.

For the hydrolysis of compounds of formulas IIc and IId, there are preferably used, for example, strong alkalis, such as aqueous alkali metal hydroxides in the presence of an inert solvent such as, for example, diethyleneglycol dimethyl ether. The hydrolysis is conveniently carried out at an elevated temperature, preferably at the boiling point of the reaction mixture, and optionally under pressure.

The compounds of formulas IIIa and IIIb are converted to those of formulas Ia and IIb by oxidation. The oxidation can be carried out utilizing an oxidizing agent, for example, with manganese dioxide in a suitable solvent, for example, in a hydrocarbon such as petroleum ether, a halogenated hydrocarbon such as methylene chloride or in acetonitrile, with a chromium trioxidepyridine complex or with tert. butyl chromate in the presence of petroleum ether, with potassium dichromate in glacial acetic, or with chromic acid in acetone, also with air in dimethyl sulfoxide or preferably with acetic acid anhydride in dimethyl sulfoxide. The reaction can be conducted at a temperature in the range of about 0° and the boiling point of the reaction mixture, depending on the oxidizing agent utilized.

The compounds of formula IV are dehydrated and deketalized in the usual manner. For example, the ketals are converted to the corresponding ketones by treatment with dilute acids, preferably with hydrohalic acids, advantageously in an inert solvent such as glacial acetic, with warming, optionally at the boiling temperature of the reaction mixture.

The compounds obtained in which R'$_1$ is alkoxycarbonyl, alkanoyl or cyano, can be cleaved by acidic or alkaline hydrolysis, preferably with mineral acids, such as, hydrochloric acid, in a solvent, such as methanol or glacial acetic, or by treatment with an alkali, such as, sodium hydroxide, in an aqueous alkanol, such as, methanol, or in a glycol, such as ethyleneglycol, at a temperature in the range of about 20° and 150°C.

The compounds obtained in which R$_1$ and R$_2$ are alkyl can be dealkylated in a known manner. The dealkylation can, for example, be carried out with a cyanogen halide, preferably, cyanogen bromide, or a haloformic acid ester so as to act on the dialkylamino group. In this reaction, one of the two alkyl groups on the nitrogen atom is initially exchanged for the cyano or alkoxycarbonyl residue. The reaction is conveniently carried out in an inert solvent, such as, ethyl ether, benzene, tetrahydrofuran or methylene chloride, at a temperature in the range of about room temperature and the boiling temperature of the reaction mixture. The cyano or alkoxycarbonyl residue is subsequently cleaved in a known manner by acidic or alkaline hydrolysis, the free base or an acid addition salt being obtained, depending upon the hydrolysis medium used.

Insofar as they contain no reducible substituents, particularly no halogen substituents, compounds of formula Ib having a semicyclic double bond can be hydrogenated. In doing so, the oxo group is conveniently protected by ketalization. Particularly suitable as ketalizing agents are lower alkanols, such as methanol, or lower glycols, such as ethyleneglycol. The hydrogenation is conveniently carried out in a catalytic manner with Raney-nickel at slightly elevated temperature, for example, at a temperature in the range of about 30° and 60°C., and under pressure, for example, at 30 to 50 atmospheres gauge or with a noble metal catalyst, preferably with platinum in the presence of an alkanol, such as ethanol, or in glacial acetic under normal conditions.

When a palladium catalyst is used under the same conditions, the semicyclic double bond can also be hydrogenated without protecting the oxo group.

Protected compounds are subsequently converted into compounds of the formula Ia, having free oxo groups as described hereinbefore.

The unsymmetrical products of formula Ib having a semicyclic double bond are obtained in different isomeric forms. Isomeric mixtures which are obtained can be separated into the geometric isomers in a known manner, for example, on the basis of the different solubility of the individual geometric isomers, i.e., the α- and β-isomers, by fractional distillation or crystallization. In the same manner, the starting compounds can also be split into the geometric isomers so that individual isomeric end products are obtained immediately.

The compounds of formulas Ia and Ib and their pharmaceutically acceptable acid addition salts exist as racemates which can be separated into their respective optical isomers utilizing known procedures, for example, through the reaction with an optically active acid, such as tartaric acid or camphorsulfonic acid and accompanying crystallization.

The separation of the geometric and/or optical isomers can also be conducted with the intermediates so that in this way the process of the invention can be carried out with the separated geometric or optically active isomers of formula IIa, IIb, IIIa or IIIb.

The invention also includes the acid addition salts of the tricyclic amines of formulas Ia and Ib. Such salts are, for example, those formed with pharmaceutically acceptable organic acids, such as oxalic acid, citric acid, acetic acid, lactic acid, maleic acid, tartaric acid or the like, or with paramaceutically acceptable inorganic acids, such as hydrochloric acid, hydrobromic acid, sulfuric acid or the like.

The compounds of formulas Ia and Ib and their pharmaceutically acceptable acid addition salts are distinguished by their antidepressant action on the nervous system, i.e., their psychopharmacological antidepressant activity, and are therefore useful as psychopharmacological antidepressants. Particularly pronounced is the antidepressive activity of the α- and β-isomers at 5-[3-(dimethylamino)propylidene]-5,11-dihydro-10H-dibenzo-[a,d]cyclohepten-10-one. The compounds of formulas Ia and Ib reduce reserpine-like sedation and they further have a noradrenaline-potentiating action. The useful psychopharmacological antidepressant activity of the compounds of formulas Ia and Ib is demonstrated in warm-blooded animals utilizing standard procedures. For example, groups comprising 10 mice each are administered the test substance in variable amounts subcutaneously. After 16 hours, they are given subcutaneously 5 mg/kg. of 2-hydroxy-2-ethyl-3-isobutyl-9,10-dimethoxy-1,2,3,4,-6,7-hexahydro-11bH-benzyl-[a]quinolizine (substance A), and 30 minutes thereafter, they are given intraperitoneally 3.75 mg/kg. of ethanol. A control group of 10 animals is given only ethanol. The duration of sleep is measured in all animals. The percentage decrease in duration in sleep in comparison with the duration of the substance A potentiated sleep reflects the psychopharmacological antidepressant effect.

When the α-isomer of 5-[3-(dimethylamino)-propylidene]-5,11-dihydro-10H-dibenzo[a,d]cyclohepten-10-one hydrochloride, which has an $LD_{50}$ of 250 mg/kg. p.o., is utilized as the test substance at a dosage of 20 mg/kg. s.c., a corresponding 50 percent decrease in duration of sleep is produced.

When the β-isomer of 5-[3-(dimethylamino)propylidene]-5,11-dihydro-10H-dibenzo[a,d]cyclohepten-10-one hydrochloride, which has an $LD_{50}$ of 500 mg/kg. p.o., is utilized as the test substance at a dosage of 20 mg/kg. s.c., a corresponding 64 percent decrease in duration of sleep is produced.

The aforementioned compounds are crystalline solids with basic properties which as previously indicated, can be conveniently prepared in the form of their acid addition salts. Said salts are characteristically crystalline solids soluble in water, somewhat less soluble in polar solvents, such as methanol, ethanol and the like, and relatively insoluble in non-polar solvents such as benzene, ether, petroleum ether and the like.

The compounds of formulas Ia and Ib and their pharmaceutically acceptable acid addition salts have effects qualitatively similar to those of amitriptyline, known for its therapeutic uses and properties. Thus, the compounds of this invention demonstrate a pattern of activity associated with psychopharmacological antidepressants of known efficacy and safety.

The compound of formulas Ia and Ib can be used as medicaments, for example, in the form of pharmaceutical preparations which contain them or their salts in admixture with a pharmaceutical, organic or inorganic inert carrier material suited for enteral or parenteral application, such as, for example, water, gelatin, lactose, starch, magnesium stearate, talc, vegetable oils, gums, polyalkylene glycols, and the like. The pharmaceutical preparations can be in solid form, for example, tablets, dragees, suppositories, capsules, or in liquid form, for example, as solutions, parenteral solutions, suspensions or emulsions. They may be sterilized and may contain additives, such as preserving, stabilizing, wetting or emulsifying agents, salts for varying the osmotic pressure or buffers. They may also contain other therapeutically valuable substances.

A suitable pharmaceutical dosage unit contains from about 1 to 50 mg. of a compound of formula Ia or Ib. Suitable oral dosage regimens in warm-blooded animals falls within the range of from about 0.1 mg/kg. per day to about 5 mg/kg. per day. Suitable parenteral dosage regimens in warm-blooded animals falls within the range of from about 0.01 mg/kg. per day to about 0.5 mg/kg. per day. However, for any particular subject, the specific dosage regimen should be adjusted according to individual need and the professional judgment of the person administering or supervising the administration of a compound of formula Ia or Ib.

The following non-limiting examples further illustrate the invention. All parts are by weight and all temperatures are in degrees centigrade, unless otherwise mentioned.

EXAMPLE 1

Preparation of
5-[3-(dimethylamino)-propylidene]-5,11-dihydro-10H-dibenzo[a,d]cyclohepten-10-one 5 g. of N,N-dimethyl-3-(10-piperidino-5H-dibenzo[a,d]-cyclohepten-5-ylidene)-propylamine are heated in 56 ml. of 2N-hydrochloric acid for 2 hours under reflux conditions. The reaction mixture is subsequently diluted with 100 ml. of water and washed with ether. The aqueous phase is made alkaline with concentrated aqueous ammonia and extracted with chloroform. The extract is dried and evaporated. The residual isomeric mixture of 5-[3-(dimethylamino)-propylidene]-5,11-dihydro-10H-dibenzo[a,d]cyclohepten-10-one, a yellow oil, is dissolved in methanolic hydrochloric acid and precipitated with ether. The β-isomer has a melting point of 251°–253° (dec.) and crystallizes first. The α-isomer crystallizes from the mother liquors and has a melting point of 222°–226° (dec.).

The N,N-dimethyl-3-(10-piperidino-5H-dibenzo[a,d]cyclohepten-5-ylidene)-propylamine employed as the starting compound can, for example, be prepared as follows:

15 g. of 3-[10-bromo-5H-dibenzo[a,d]cyclohepten-5-ylidene]-N,N-dimethylpropylamine are heated under reflux conditions for 2 hours with 6.2 g. of potassium tert. butylate and 100 ml. of piperidine in 200 ml. of dioxane while gassing with argon. Subsequently, the reaction mixture is filtered. The filtrate is evaporated under reduced pressure, and the resulting oily residue is taken up in ether, washed with water, dried and evaporated. For further purification, it is taken up in benzene and filtered through a column of 60 g. of aluminum oxide (activity grade 1). The N,N-dimethyl-3-(10piperidine-5H-dibenzo[a,d]cyclohepten-5-ylidene)-prepylamine, a yellowish oil, which remains after the evaporation of the solvent, can be utilized without further purification.

When diethylamine is employed instead of piperidine and the reaction mixture is heated under reflux conditions for 20 hours, N,N-dimethyl-3-(10-diethylamino-5H-dibenzo[a,d]cyclohepten-5-ylidene)-propylamine is obtained as a yellowish oil. The nuclear magnetic resonance spectrum and the Raman spectrum is in accord with the stated structure.

EXAMPLE 2

Preparation of the α-isomer of
1-chloro-5-[3-(dimethylamino)-propylidene]-5,11-dihydro-10H-dibenzo[a,d]cyclohepten-10-one A mixture containing 3.5 g. of N,N-dimethyl-3-(1-chloro-10-piperidino-5H-dibenzo[a,d]cyclohepten-5-ylidene)-propylamine (α-isomer) and 48 ml. of 2N hydrochloric acid were heated under reflux for 2 hours. The solution was diluted with 70 ml. of water after cooling and made alkaline with concentrated sodium hydroxide. The aqueous phase was shaken 3 times with chloroform. The organic solution was rewashed with water, dried over sodium sulfate and evaporated under reduced pressure to yield 1-chloro-5-[3-(dimethylamino)-propylidene[-5,11-dihydro-10H-dibenzo[a,d]-cyclohepten-10-one, which was filtered on a 15-fold aluminum oxide (activity grade II). The resulting oil was dissolved in ethanol and was treated with a 28 percent ethanolic hydrochloric acid solution at room temperature. The solution was concentrated at reduced pressure, and the residue was washed several times with absolute benzene to yield a foam which was recrystallized from acetone to yield 1-chloro-5-[3-(dimethylamino)propylidene]-5,11-dihydro-10H-dibenzo[a,d]cyclohepten-10-one hydrochloride having a melting point of 231°–233°.

The α-isomer of N,N-dimethyl-3-(1-chloro-10-piperidino-5H-dibenzo[a,d]cyclohepten-5-ylidene)propylamine employed as a starting compound can be obtained as follows:

At room temperature, in an atmosphere of nitrogen, a reaction mixture containing 3.9 g. of N,N-dimethyl-3-(1-chloro-10(or 11)-bromo-5H-dibenzo[a,d]cyclohepten-5-ylidene)propylamine (α-isomer), 1.5 g. of potassium tertiary butylate, 23.5 ml. of piperidine and 47 ml. of absolute alcohol are reacted over an 18-hour period. Thereafter, the reaction mixture is poured into 150 ml. of water. The aqueous phase is extracted 3 times with ether. The resulting ethereal solution is washed several times with water, dried over sodium sulfate, filtered and evaporated. The solid residue is recrystallized from high-boiling petroleum ether, to yield N,N-dimethyl-3-(1-chloro-10-piperidino-5H-dibenzo[a,d]-cyclohepten-5-ylidene)propylamine having a melting point of 129°–131°. The compound consisted of the α-isomer.

EXAMPLE 3

Preparation of the β-isomer of
1-chloro-5-[3-(dimethylamino)-propylidene]-5,11-dihydro-10H-dibenzo[a,d]cyclohepten-10-one 5 g. of N,N-dimethyl-3-(1-chloro-10-piperidino-5H-dibenzo-[a,d]cyclohepten-5-ylidene)propylamine (β-isomer) and 80 ml. of 2N-hydrochloric acid are heated under reflux for 2 hours. Thereafter, the procedure of Example 2 is followed to obtain the β-isomer of 1-chloro-5-[3-(dimethylamino)-propylidene]-5,11-dihydro-10H-dibenzo[a,d]cyclohepten-10-one hydrochloride, which after recrystallization from acetone, had a melting point of 222°–224°.

The β-isomer of N,N-dimethyl-3-(1-chloro-10-piperidino-5H-dibenzo[a,d]cyclohepten-5-ylidene)-propylamine employed as the starting compound can be prepared, for example, as follows:

A mixture containing 3.9 g. of N,N-dimethyl-3-(1-chloro-10-(or 11)-bromo-5H-dibenzo[a,d]cyclohepten-5-ylidene)-propylamine (70 percent β-isomer and 30 percent α-isomer), 1.5 g. of potassium tertiary butylate, 23.5 ml. of piperidine (dried over potassium hydroxide) and 37 ml. of absolute ether are reacted and worked up according to the procedures of Example 1 to yield N,N-dimethyl-3-(1-chloro-10-piperidino-5H-dibenzo[a,d]cyclohepten-5-ylidene)-propylamine, which after recrystallization from high-boiling petroleum ether had a melting point of 124°–126° and consisted of the pure β-isomer.

EXAMPLE 4

| Capsules: | Per Capsule |
| --- | --- |
| β-5-[3-(Dimethylamino)-propylidene]-5,11-dihydro-10H-dibenzo[a,d]cyclohepten-10-one | 10 mg. |
| Mannitol | 110 mg. |
| Talcum | 5 mg. |
|  | 125 mg. |

The active substance is mixed with the adjuvants, passed through a No. 5 sieve (mesh width about 0.23 mm.) and again thoroughly mixed. The mixture is filled into No. 4 gelatin capsules.

We claim:
1. A compound selected from the group consisting of members of the formulas

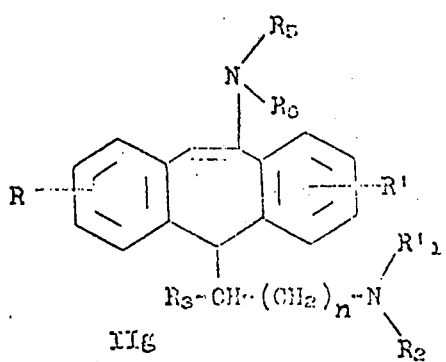

IIg and

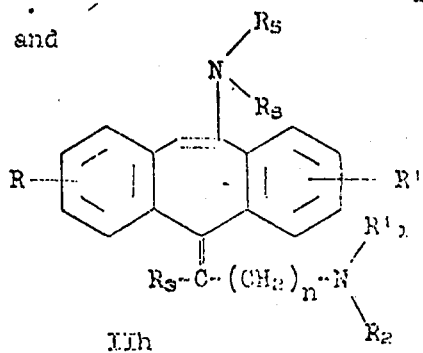

IIh wherein *n* is an integer from 0 to 3; R and R' are selected from the group consisting of hydrogen, halogen, lower alkyl, lower alkoxy and lower alkanoyl; $R'_1$ is selected from the group consisting of hydrogen, lower alkyl, lower alkoxycarbonyl, lower alkanoyl and cyano; $R_2$ is lower alkyl; $R_3$ is hydrogen; $R_5$ and $R_6$ are selected from the group consisting of lower alkyl, lower alkenyl and phenyl-lower alkyl; $R'_1$ and $R_2$, taken together with the nitrogen atom, are a 5- or 6-membered saturated heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; $R_5$ and $R_6$, taken together with the nitrogen atom, are a 5- or 6-membered saturated, unsubstituted or substituted by lower alkyl heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; and $R_2$ and $R_3$, taken together, are lower alkylene, and acid addition salts thereof.

2. A compound in accordance with claim 1 of the formula

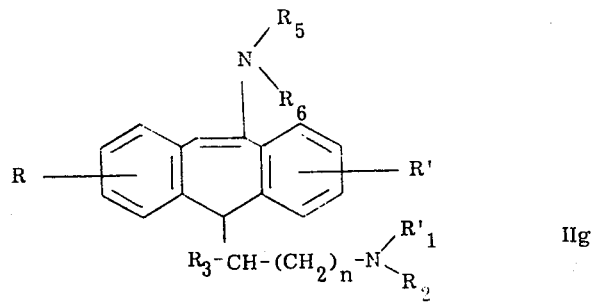

IIg wherein *n* is an integer from 0 to 3; R and R' are selected from the group consisting of hydrogen, halogen, lower alkyl, lower alkoxy and lower alkanoyl; $R'_1$ is selected from the group consisting of hydrogen, lower alkyl, lower alkoxycarbonyl, lower alkanoyl and cyano; $R_2$ is lower alkyl; $R_3$ is hydrogen; $R_5$ and $R_6$ are selected from the group consisting of lower alkyl, lower alkenyl and phenyl-lower alkyl; $R'_1$ and $R_2$, taken together with the nitrogen atom, are a 5- or 6-membered saturated heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; $R_5$ and $R_6$, taken together with the nitrogen atom, are a 5- or 6-membered saturated, unsubstituted or substituted by lower alkyl heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; and $R_2$ and $R_3$, taken together, are lower alkylene, and acid addition salts thereof.

3. A compound in accordance with claim 1 of the formula

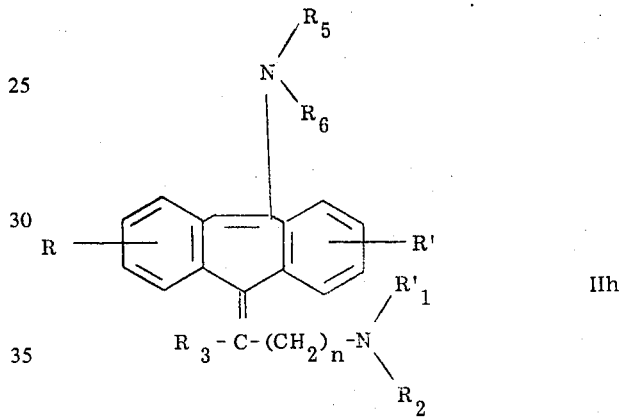

IIh wherein *n* is an integer from 0 to 3; R and R' are selected from the group consisting of hydrogen, halogen, lower alkyl, lower alkoxy and lower alkanoyl; $R'_1$ is selected from the group consisting of hydrogen, lower alkyl, lower alkoxycarbonyl, lower alkanoyl and cyano; $R_2$ is lower alkyl; $R_3$ is hydrogen; $R_5$ and $R_6$ are selected from the group consisting of lower alkyl, lower alkenyl and phenyl-lower alkyl; $R'_1$ and $R_2$, taken together with the nitrogen atom, are a 5- or 6-membered saturated heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; $R_5$ and $R_6$, taken together with the nitrogen atom, are a 5- or 6-membered saturated, unsubstituted or substituted by lower alkyl heterocyclic residue selected from the group consisting of piperidino, lower alkyl-substituted piperidino, piperazino, lower alkyl-substituted piperazino, pyrrolidino, lower alkyl-substituted pyrrolidino, morpholino and lower alkyl-substituted morpholino; and $R_2$ and $R_3$, taken together, are lower alkylene, and acid addition salts thereof.

4. A compound in accordance with claim 3, wherein R, R' and $R_3$ are hydrogen, $R'_1$ and $R_2$ are methyl and $R_5$ and $R_6$, taken together with the nitrogen atom is piperidino, i.e., N,N-dimethyl-3-(10-piperidino-5H-dibenzo[a,d]cyclohepten-5-ylidene)-propylamine.

5. A compound in accordance with claim 3, wherein R, R' and $R_3$ are hydrogen, $R'_1$, $R_2$, $R_5$ and $R_6$ are methyl, i.e., N,N-dimethyl-3-(10-dimethylamino-5H-dibenzo[a,d]cyclohepten-5-ylidene)-propylamine.

6. A compound in accordance with claim 3, wherein R and $R_3$ are hydrogen, R' is chlorine, $R'_1$ and $R_2$ are methyl, and $R_5$ and $R_6$, taken together with the nitrogen atom is piperidino, i.e., N,N-dimethyl-3-(1-chloro-10-piperidino-5H-dibenzo[a,d]cyclohepten-5-ylidene)-propylamine.

7. A compound in accordance with claim 3, i.e., the α-isomer of N,N-dimethyl-3-(1-chloro-10-piperidino-5H-dibenzo-[a,d]cyclohepten-5-ylidene)-propylamine.

8. A compound in accordance with claim 3, i.e., the β-isomer of N,N-dimethyl-3-(1-chloro-10-piperidino-5H-dibenzo-[a,d]cyclohepten-5-ylidene)-propylamine.

* * * * *

UNITED STATES PATENT OFFICE
CERTIFICATE OF CORRECTION

PATENT NO. : 3,898,239
DATED : August 5, 1975
INVENTOR(S) : Emilio Kyburz & Hans Spiegelberg It is certified that error appears in the above-identified patent and that said Letters Patent are hereby corrected as shown below:

Cover Sheet, after [60] Related U.S. Application Data, insert:

[30] Foreign Application Priority Data

August 3, 1967         Switzerland         11056/67

Column 14, claim 5, line 68, "$R_8$" should be: $R_6$

Signed and Sealed this thirteenth Day of April 1976

[SEAL]

Attest:

RUTH C. MASON
*Attesting Officer*

C. MARSHALL DANN
*Commissioner of Patents and Trademarks*